United States Patent
Branco et al.

(10) Patent No.: US 6,637,732 B2
(45) Date of Patent: Oct. 28, 2003

(54) PNEUMATIC SUSPENSION SYSTEM

(75) Inventors: Antonio Branco, Hamburg (DE); Michael Weber, Buchholz (DE)

(73) Assignee: Phoenix AG, Hamburg (DE)

( * ) Notice: Subject to any disclaimer, the term of this patent is extended or adjusted under 35 U.S.C. 154(b) by 0 days.

(21) Appl. No.: 09/959,039

(22) PCT Filed: Jan. 26, 2001

(86) PCT No.: PCT/DE01/00324
§ 371 (c)(1),
(2), (4) Date: Oct. 16, 2001

(87) PCT Pub. No.: WO01/61206
PCT Pub. Date: Aug. 23, 2001

(65) Prior Publication Data
US 2002/0158380 A1 Oct. 31, 2002

(30) Foreign Application Priority Data
Feb. 17, 2000 (DE) ........................... 100 07 312

(51) Int. Cl.⁷ ............................. F16F 9/05; B60G 11/27
(52) U.S. Cl. ................. 267/64.27; 267/122; 267/64.11
(58) Field of Search .................. 267/64.27, 122, 267/64.23, 64.21, 64.24, 64.11, 127, 124; 92/98 D, 103 F; 280/124.157, 124.16, 124.158

(56) References Cited

U.S. PATENT DOCUMENTS

| | | | |
|---|---|---|---|
| 3,043,582 A | 7/1962 | Hirtreiter | |
| 3,351,337 A | 11/1967 | Kunio et al. | |
| 3,438,309 A | 4/1969 | Boileau | 267/122 |
| 3,876,193 A | 4/1975 | Clary | |
| 4,200,270 A | 4/1980 | Merkle | |
| 4,378,935 A | 4/1983 | Brown et al. | 267/64.27 |
| 4,493,481 A | 1/1985 | Merkle | 267/64.27 |
| 4,657,229 A | 4/1987 | Thurow | |
| 4,763,883 A | 8/1988 | Crabtree | |
| 4,817,922 A | 4/1989 | Hovance | |
| 5,005,808 A | 4/1991 | Warmuth, II et al. | |
| 5,129,634 A | 7/1992 | Harris | |
| 5,286,010 A | 2/1994 | Pahl et al. | 267/122 |
| 5,346,187 A | 9/1994 | Drescher | |
| 5,374,037 A * | 12/1994 | Bledsoe | |
| 5,669,597 A * | 9/1997 | Rittstieg et al. | |
| 5,671,907 A | 9/1997 | Arnold | |
| 5,954,316 A * | 9/1999 | Voss | |
| 6,315,274 B1 * | 11/2001 | Sonnak | |
| 6,386,523 B1 * | 5/2002 | Crabtree et al. | |

FOREIGN PATENT DOCUMENTS

| | | |
|---|---|---|
| DE | 15 30 135 | 8/1969 |
| DE | 198 19 642 | 12/1998 |
| DE | 198 42 733 | 4/1999 |
| DE | 100 01 018 | 7/2000 |
| DE | 10103493 | 8/2001 |
| EP | 0 391 075 | 10/1990 |
| EP | 0 448 833 | 10/1991 |
| JP | 55 076237 | 6/1980 |

* cited by examiner

Primary Examiner—Douglas C. Butler
(74) Attorney, Agent, or Firm—Collard & Roe, P.C.

(57) ABSTRACT

A pneumatic suspension system comprising: a pneumatic suspension bellows made of an elastomeric material which encloses an air chamber whose volume varies, with an embedded strengthening support; a pressure reservoir having an outer diameter on which one end of the pneumatic suspension bellows is fastened by a clamping ring; and a pneumatic suspension piston having an outer diameter on which the other end of the pneumatic suspension bellows is also fastened by a clamping ring, and having a roll-off piston on whose outer wall the pneumatic suspension bellows can roll off while forming a first rolling fold. The pressure reservoir has a contoured roll-off surface outside of the first fastening area. The roll-off surface is provided for a second rolling fold which rests against the roll-off surface and can roll off in a limited manner compared to the first rolling fold.

6 Claims, 1 Drawing Sheet

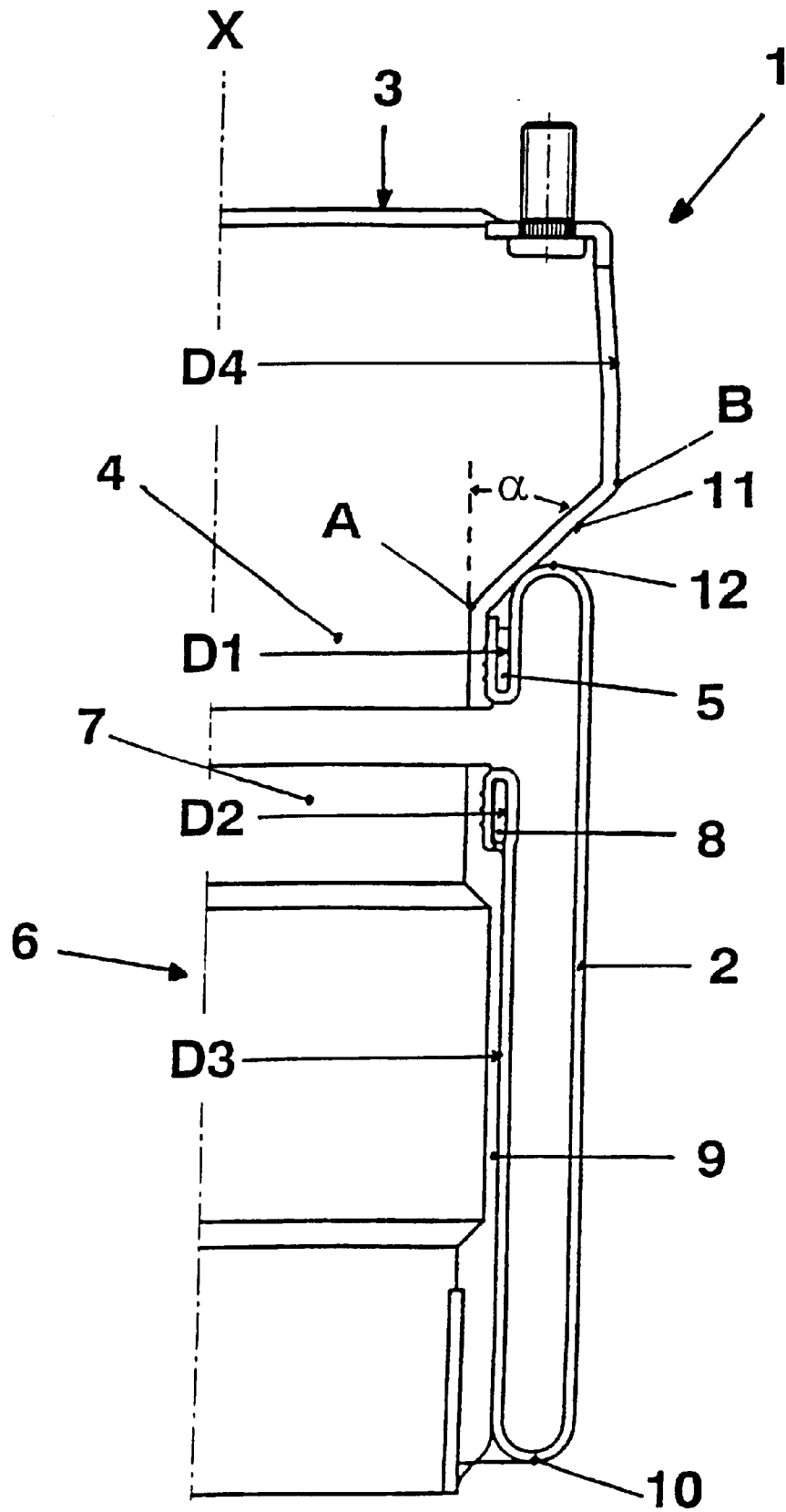

PNEUMATIC SUSPENSION SYSTEM

CROSS REFERENCE TO RELATED APPLICATIONS

Applicants claim priority under 35 U.S.C. §119 of German Application No. 100 07 312.3 filed Feb. 17, 2000. Applicants also claim priority under 35 U.S.C. §120 of PCT/DE01/00324 filed Jan. 26, 2001. The international application under PCT article 21(2) was not published in English.

DESCRIPTION

The invention relates to a pneumatic suspension system comprised of at least the following pneumatic system components, notably of
- a pneumatic suspension bellows made of an elastomeric material, which encloses an air chamber with a variable volume and is provided with an embedded reinforcing support in most cases (axial bellows; bellows with crossed layers);
- a pressure reservoir comprising a first fastening area on which the one end of the pneumatic suspension bellows is secured by means of a clamping ring; as well as
- a pneumatic suspension piston comprising a second fastening area on which the other end of the pneumatic suspension bellows is secured by means of a clamping ring as well, as well as a roll-off piston on whose outer wall the pneumatic suspension bellows is capable of rolling off while forming a first rolling fold.

A pneumatic suspension system of the type specified above is known both in the manufacture of utility motor vehicles and passenger cars (DE-A-198 19 642; DE-A-100 01 018).

Now, the problem of the invention is to further develop the pneumatic suspension system of the type specified above in such a manner that the comfort properties are enhanced, The problem is solved in that the pressure reservoir is provided outside of the first fastening area with a contoured roll-off surface for a second roll-off fold that increases its outside diameter, and comprises a beginning and an end. The rolling fold is constantly resting against the roll-off surface and capable of rolling off only to a limited extent vis-a-vis the first rolling fold.

The two rolling folds, which are connected in series, lead to a substantial improvement of the comfort properties.

BRIEF DESCRIPTION OF THE DRAWING

Other objects and features of the present invention will become apparent from the following detailed description considered in connection with the accompanying drawings. It is to be understood, however, that the drawings are designed as an illustration only and not as a definition of the limits of the invention.

The single figure shows a pneumatic suspension system.
1 Pneumatic suspension system
2 Pneumatic suspension bellows
3 Pressure reservoir (pneumatic suspension cover)
4 First fastening area
5 Clamping ring
6 Pneumatic suspension piston
7 Second fastening area
8 Clamping ring
9 Roll-off piston (immersing plunger)
10 First rolling fold
11 Contoured roll-off surface
12 Second rolling fold (pneumatic suspension loop)
D1 Outside diameter of first fastening area
D2 Outside diameter of second fastening area
D2 Outside diameter of roll-off piston
D4 Outside diameter of pressure reservoir
A Beginning of roll-off surface
B End of roll-off surface
X Axis of pneumatic suspension system
α Angle of roll-off surface The important structural components of the pneumatic suspension system 1 according to the only figure are the pneumatic suspension bellows 2, the pressure reservoir 3 and the pneumatic suspension piston 6. The pressure reservoir comprises in this connection a first fastening area 4 with an outside diameter D1, on which the one end of the pneumatic suspension bellows is secured by means of a clamping ring 5, whereby the outside diameter D1 includes the clamping ring. The pneumatic suspension piston comprises a second fastening area 7 with an outside diameter D2, on which the other end of the pneumatic suspension bellows is secured by means of a clamping ring 8 as well, whereby the outside diameter D2 includes the clamping ring also in the present case. Furthermore, the pneumatic suspension piston comprises a roll-off piston 9 with an outside diameter D3, on whose outer wall the pneumatic suspension bellows is capable of rolling off while forming a first rolling fold 10.

Now, the pneumatic suspension system 1 as defined by the invention is characterized in that the pressure reservoir 3 is provided outside of the first fastening area 4, namely particularly in direct connection with said fastening area, with a contoured roll-off surface 11 for a second rolling fold 12. Said contoured roll-off surface comprises a beginning A and an end B and increases the outside diameter D4. In this connection, the rolling fold always rests against the roll-off surface and can roll-off only to a limited extent as compared to the first rolling fold 10.

Thus the outside diameter D4 of the pressure reservoir is increased between the points A and B of the roll-off surface 11. The diameter D4 is the largest at the end point B with respect to the roll-off surface. Beyond said end point B, the pressure reservoir 3 mostly continues to extend substantially in a cylindrical form.

The roll-off surface 11 for the second rolling fold 12 substantially extends in a conical form. Furthermore, the roll-off surface and the first fastening area 4 of the pressure reservoir 3 merge into one another, forming one piece. Such a one-piece embodiment relates in this connection to the direct fastening area 4 without including the pneumatic suspension bellows 2 and the clamping ring 5.

The roll-off surface 11 for the second rolling fold 12 extends at an angle α of from 15° to 70° based on the axis of the pneumatic suspension system 1.

The following associations apply with respect to the outside diameters D1, D2, D3 and D4:
D3>D1
D4>D2
D4>D3.

With respect to the outside diameter D4 of the pressure reservoir 3, the end point B of the roll-off surface 11 applies as the reference point.

What is claim is:
1. A pneumatic suspension system comprising the following structural components:
   a pneumatic suspension bellows made of an elastomeric material and enclosing an air chamber with a variable volume, wherein said pneumatic suspension bellows is provided with an embedded reinforcement;

a pressure reservoir having a first fastening area with an outside diameter (D1); on which a first end of said pneumatic suspension bellows is secured via a first clamping ring, and wherein said outside diameter (D1) includes said first clamping ring; and a pneumatic suspension piston having a second fastening area with an outside diameter (D2), on which a second end of said pneumatic suspension bellows is secured by means of a second clamping ring, wherein said outside diameter (D2) includes said second clamping ring and a roll-off piston with an outside diameter (D3), on whose outer wall said pneumatic suspension bellows is capable of rolling off while forming a first rolling fold;

wherein said pressure reservoir is disposed outside of said first fastening area with a contoured roll-off surface comprising a beginning and an end for a second rolling fold and increasing its outside diameter, said second rolling fold constantly resting against said roll-off surface and being capable of rolling off only to a limited extent as compared to said first rolling fold;

wherein said outside diameter of said first fastening area is less than said outside diameter of said roll-off piston;

wherein said outside diameter of said second fastening area is less than an increased outside diameter (D4) of said pressure reservoir at said end of said roll-off surface; and wherein said outside diameter of said roll-off piston is less than the increased diameter (D4) of said pressure reservoir and said end of said roll-off.

2. The pneumatic suspension system according to claim 1, wherein said roll-off surface for said second rolling fold extends in a substantially conical form.

3. The pneumatic suspension system according to claim 1, wherein said roll-off surface for said second rolling fold directly adjoins said first fastening area.

4. The pneumatic suspension system according to claim 1, wherein said roll-off surface for said second rolling fold and said first fastening area of said pressure reservoir merge into one another, forming one piece.

5. The pneumatic suspension system according to claim 1, wherein said roll-off surface for said second rolling fold extends at an angle of 15° to 70° based on an axis of said pneumatic suspension system.

6. The pneumatic suspension system according to claim 5, wherein said roll-off surface for said second rolling fold extends at an angle of 30° to 50°.

\* \* \* \* \*